United States Patent [19]

Jung

[11] Patent Number: 5,767,909

[45] Date of Patent: Jun. 16, 1998

[54] APPARATUS FOR ENCODING A DIGITAL VIDEO SIGNAL USING AN ADAPTIVE SCANNING TECHNIQUE

[75] Inventor: Hae-Mook Jung, Seoul, Rep. of Korea

[73] Assignee: Daewoo Electronics, Co., Ltd., Seoul, Rep. of Korea

[21] Appl. No.: 624,794

[22] Filed: Mar. 27, 1996

[30] Foreign Application Priority Data

Mar. 28, 1995 [KR] Rep. of Korea ............. 95-6630

[51] Int. Cl.$^6$ ........................................ H04N 7/12
[52] U.S. Cl. ............... 348/403; 348/409; 382/248; 382/168
[58] Field of Search ............... 348/403, 404, 348/408, 409, 420, 422, 421; 382/50, 51, 52, 53, 56, 168, 248, 250, 251, 245, 238, 236; H04N 7/12

[56] References Cited

U.S. PATENT DOCUMENTS

| | | | |
|---|---|---|---|
| 5,046,121 | 9/1991 | Yonekawa et al. | 382/56 |
| 5,070,402 | 12/1991 | Ishii et al. | 348/421 |
| 5,321,776 | 6/1994 | Shapiro | 382/56 |
| 5,418,714 | 5/1995 | Sarver | 364/413.13 |
| 5,500,678 | 3/1996 | Puri | 348/408 |

*Primary Examiner*—Amelia Au
*Assistant Examiner*—Y. Lee
*Attorney, Agent, or Firm*—Pennie & Edmonds LLP

[57] ABSTRACT

An apparatus for encoding a digital video signal to provide a digitally coded video signal comprises a source coder for generating a set of quantized transform coefficients corresponding to each of the coding blocks, a scanning order determination block for adaptively determining a scanning order for each video frame based on a number of quantized transform coefficients having a non-zero value, located at a same pixel position in each of the coding blocks contained in a video frame and generating scanning order information representing the scanning order for each video frame, a scanner for scanning the set of quantized transform coefficients in response to the scanning order information to thereby generate scanned quantized transform coefficients, a statistical coder for statistically coding the scanned quantized transform coefficients to thereby generate statistically coded data, and a channel coder for encoding the statistically coded data together with the scanning order information to thereby generate digitally coded video signal.

6 Claims, 2 Drawing Sheets

5,767,909

APPARATUS FOR ENCODING A DIGITAL VIDEO SIGNAL USING AN ADAPTIVE SCANNING TECHNIQUE

FIELD OF THE INVENTION

The present invention relates to an apparatus for encoding a digital video signal; and, more particularly, to a digital video signal encoding apparatus which employs an adaptive scanning technique, thereby effectively reducing the amount of transmission data.

DESCRIPTION OF THE PRIOR ART

Transmission of digitized video signals can deliver video images of a much higher quality than the transmission of analog signals. When an image signal comprising a sequence of image "frames" is expressed in a digital form, a substantial amount of data is generated for transmission, especially in the case of high definition television system. Since, however, the available frequency bandwidth of a conventional transmission channel is limited, in order to transmit the substantial amounts of digital data through the limited channel bandwidth, it is inevitable to compress or reduce the volume of the transmission data. Among various video compression techniques, the so-called hybrid coding technique, which combines temporal and spatial compression techniques together with a statistical coding technique, is known to be most effective.

Most hybrid coding techniques employ a motion compensated DPCM(differential pulse code modulation), two-dimensional DCT(discrete cosine transform), quantization of DCT coefficients, and VLC(variable length coding). The motion compensated DPCM is a process of determining the movement of an object between a current frame and a previous frame, and predicting the current frame according to the motion flow of the object to produce a differential signal representing the difference between the current frame and its prediction.

The two-dimensional DCT, which reduces or removes spatial redundancies between image data such as motion compensated DPCM data, converts a block of digital image data, for example, a block of 8×8 pixels, into a set of transform coefficient data. The transform coefficient data are quantized so as to take advantage of the occurrence of "zeros" and then scanned by using a fixed scanning order such as a zigzag fashion, thereby generating a stream of image data having a plurality of zeros and non-zero values. Thereafter, the data stream is subjected to VLC which is one of the widely known statistical coding techniques for achieving a bit rate reduction and converts fixed-length data to variable-length codewords based on the statistical occurrences of the data. In the VLC technique, since a shorter variable length codeword is assigned to a source digital code which statistically occurs more frequently, the average length of the variable length codeword becomes shorter than that of the source digital code, thereby rendering it possible to achieve data compression.

Since, however, the fixed scanning order employed in the afore-described conventional scheme is determined based on a statistical probability of the transform coefficients in image data without considering actual statistics thereof, it is impossible to achieve an efficient bit rate reduction.

SUMMARY OF THE INVENTION

It is, therefore, an object of the invention to provide a digital video signal encoder which is capable of providing an efficient bit rate reduction by using an adaptive scanning order based on actual statistics of transform coefficients in image data.

In accordance with the invention, there is provided a digital video signal encoder for coding a digital video signal to provide a digitally coded video signal, wherein the digital video signal is represented by a series of video frames, each video frame being divided into a plurality of coding blocks, which comprises: a source coder for generating a set of quantized transform coefficients corresponding to each of the coding blocks; a scanning order determination block for adaptively determining a scanning order for each video frame based on a number of quantized transform coefficients having a non-zero value, located at a same pixel position in each of the coding blocks contained in a video frame and generating scanning order information representing the scanning order for each video frame; a scanner for scanning the set of quantized transform coefficients in response to the scanning order information to thereby generate scanned quantized transform coefficients; a statistical coder for performing the statistical coding of the scanned quantized transform coefficients to thereby generate statistically coded data; and a channel coder for encoding the statistically coded data together with the scanning order information to thereby generate digitally coded video signal.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
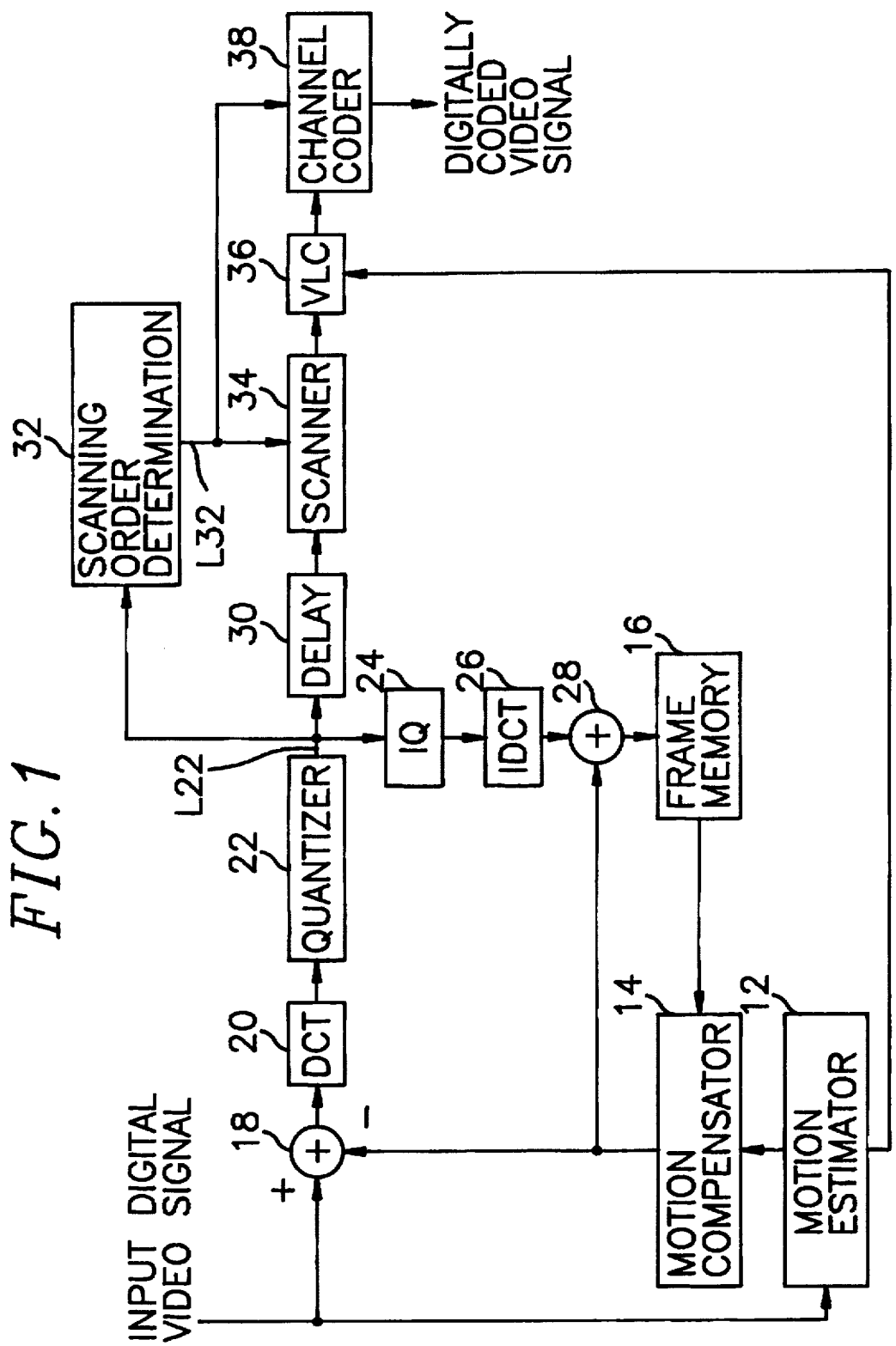
FIG. 1 is a block diagram of a video signal encoder which comprises a scanning order determination block of the present invention.

Referring to FIG. 1, there is shown a block diagram of an inventive video signal encoder for coding a digital video signal, wherein the digital video signal is represented by a series of video frames, each video frame being divided into a plurality of coding blocks.

As shown, an input digital video signal is fed as current frame data to a subtractor 18 and a motion estimator 12. Actually, the input digital video signal is read, on a block-by-block basis, from an input memory(not shown), wherein each frame of video signals is stored as successive coding blocks of pixel data for processing on a block-by-block basis. The block size of the input digital video signal typically ranges between 8×8 and 32×32 pixels.

The motion estimator 12 serves to determine a motion vector for each of the search blocks by using a known motion estimation method such as a block matching technique. After determining the motion vectors for the whole search blocks of the current frame, the motion vectors are fed to the motion compensator 14 and a variable length coding (VLC) coder 36.

In response to each of the motion vectors, a prediction signal, i.e., pixel data of a candidate block corresponding to the motion vector, is extracted from a frame memory 16 and provided to the subtractor 18 and an adder 28 by the motion compensator 14. The prediction signal from the motion compensator 14 is subtracted from the input digital video signal at the subtractor 18; and the resultant data, i.e., an error signal, is dispatched to a transform coder, e.g., a DCT coder 20, wherein a block of the error signal, for instance, a block of 8×8 pixel data, is encoded into a block of transform coefficient data. Those skilled in the art will appreciate that other transform techniques may be employed in lieu of the DCT described herein.

At a quantizer 22, the transform coefficients from the DCT coder 20 are quantized into a set of quantized DCT coefficients which is subsequently fed to a scanning order determination block 32, a delay circuit 30 and an inverse quantizer(IQ) 24 through a line L22. The quantized DCT coefficients are converted back into a set of reconstructed DCT coefficients at the IQ 24. The set of reconstructed DCT coefficients is then applied to an inverse discrete cosine transformer(IDCT) 26 and transformed therein into a block of reconstructed pixel data. At the adder 28, the prediction signal from the motion compensator 14 and the block of reconstructed pixel data from IDCT 26 are summed to provide a reconstructed block signal of the current frame to be written onto the frame memory 16. The frame memory 16 has two frame memory locations storing the current and the previous frame data. The output signal from the adder 28 comprises blocks of pixel data. When all of the blocks representing the current frame are stored in the frame memory 16, new frame data is provided from the adder 28. At this moment, the new data is referred to as a current frame and the current frame data previously stored in the frame memory 16 is referred to as the previous frame.

In the meantime, the quantized DCT coefficients from the quantizer 22 are transferred to the scanning order determination block 32. The scanning order determination block adaptively determines a scanning order for each video frame based on a number of quantized DCT coefficients having a non-zero value, located at a same pixel position in each of the coding blocks contained in a video frame and generates scanning order information representing the scanning order for each video frame to a scanner 34 and a channel coder 38 via a line L32(Details of the scanning order determination block 32 will be described hereinafter with reference to FIG. 2). The quantized DCT coefficients on the line L22 are also transferred to the delay circuit 30 which delays the quantized DCT coefficients for one frame period. The scanner 34 scans the quantized DCT coefficients supplied from the quantizer 22 through the delay circuit 30 in response to the scanning order information from the scanning order determination block 32 to thereby generate scanned quantized DCT coefficients. The VLC coder 36 converts the scanned data into a set of variable length coded data. The VLC coder 36 is basically a look-up table: that is, in the VLC coder 36, a plurality of code sets is provided to define a respective relationship between each set of a zeros run-length and a level of the quantized DCT coefficients and its variable length code, wherein the level is a quantized DCT coefficient with a non-zero value and the zeros run-length refers to the total number of successive zeros preceding the level in the scanning sequence. It should be noted that other statistical coding techniques may be employed in lieu of the VLC described herein. The motion vectors from the motion estimator 12 are also coded by the VLC coder 36. The encoded data from the VLC coder 36 is applied to the channel coder 38. The channel coder 38 encodes the VLC coded data together with the scanning order information to thereby generate a digitally coded video signal.

Figure 2:
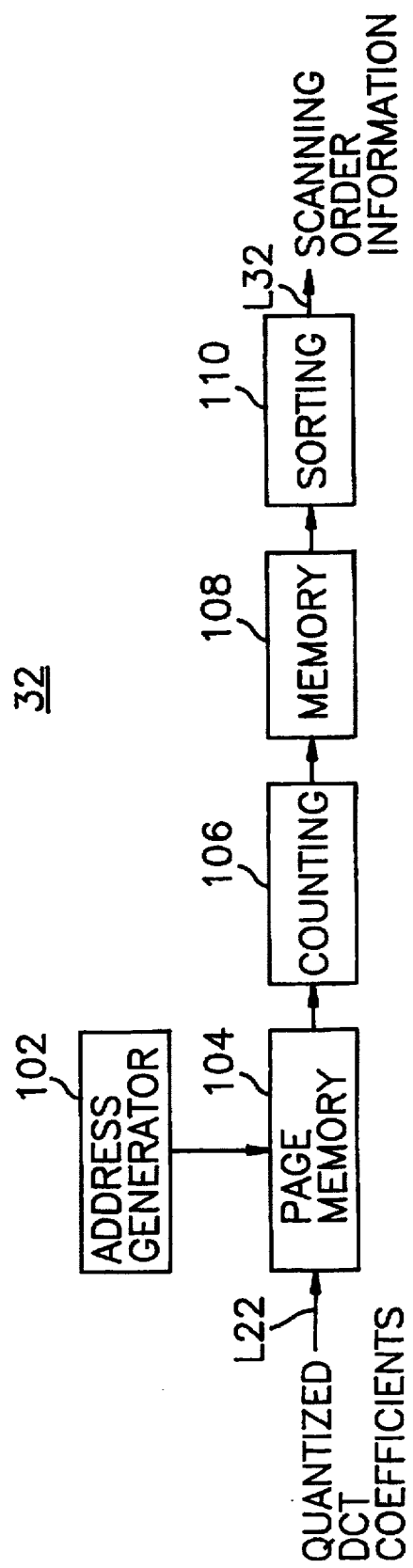
FIG. 2 shows a detailed block diagram of the scanning order determination block shown in FIG. 1.

Referring now to FIG. 2, there is illustrated a detailed block diagram of the scanning order determination block 32 shown in FIG. 1. The quantized DCT coefficients from the quantizer 22 shown in FIG. 1 are sequentially provided to a page memory 104 which is coupled to an address generator 102 for generating a set of position addresses and a set of block addresses for each position address. The position addresses represent the pixel positions in a coding block and the set of block addresses for each of the position addresses sequentially designates the plurality of the coding blocks in the video frame. The page memory 104 having a plurality of storage regions, each of which stores the set of quantized DCT coefficients for each of the plurality of coding blocks therein, sequentially produces a multiplicity of data sets to a counting circuit 106 in response to each position address and the set of block addresses for each of the position addresses, each of the data sets including the quantized DCT coefficients located at the same position in each coding block. The counting circuit 106 counts a number of the quantized DCT coefficients having a non-zero value in each of the data sets and provides a histogram index for each of the data sets to a memory device 108, the histogram index representing the counted number for each data set. The memory device 108 sequentially stores the histogram indexes for the data sets to thereby provide histogram information including the multiplicity of histogram indexes and position data representing a pixel position corresponding to each of the histogram indexes to a sorting circuit 110. The sorting circuit 110 sorts the histogram indexes included in the histogram information in the order of descending magnitudes and generates onto a L32 a set of position data corresponding to the sorted histogram indexes as the scanning order information.

As may be seen from the above, the inventive apparatus encodes a digital video signal by using an adaptive scanning order based on actual statistics of transform coefficients in image data thereby providing an efficient bit rate reduction.

While the present invention has been described with respect to the particular embodiments, it will be apparent to those skilled in the art that various changes and modifications may be made without departing from the spirit and scope of the invention as defined in the following claims.

What is claimed is:

1. A digital video signal encoder for coding a digital video signal to provide a digitally coded video signal, wherein the digital video signal is represented by a series of video frames, each video frame being divided into a plurality of coding blocks, which comprises:

source coding means for generating a set of quantized transform coefficients corresponding to each of the coding blocks;

scanning order determination means for adaptively determining a scanning order for each video frame based on a number of quantized transform coefficients having a non-zero value, located at a same pixel position in each of the coding blocks contained in a video frame and generating scanning order information representing the scanning order for said each video frame;

scanning means for scanning the set of quantized transform coefficients in response to the scanning order information to thereby generate scanned quantized transform coefficients;

statistical coding means for performing the statistical coding of the scanned quantized transform coefficients to thereby generate statistically coded data; and channel coding means for encoding the statistically coded data together with the scanning order information to thereby generate digitally coded video signal; wherein the scanning order determination means includes:

means for generating a set of position addresses representing the pixel positions in a coding block;

means for generating a set of block addresses in response to each of the position addresses, the block addresses sequentially designating the plurality of the coding blocks in the video frame;

first memory means having a plurality of storage regions, for storing the set of quantized transform coefficients for each of the coding blocks in each storage region thereof, and sequentially producing a multiplicity of data sets in response to each of the position addresses and the set of block addresses for each of the position addresses, each of the data sets including the quantized transform coefficients located at the same position in each of the coding blocks;

means for counting a number of the quantized transform coefficients having the non-zero value in each of the data sets and providing a histogram index for each data set, the histogram index representing the counted number for that data set;

second memory means for sequentially storing the histogram indexes for the data sets to thereby provide histogram information including the multiplicity of histogram indexes and position data representing a pixel position corresponding to each of the histogram indexes; and means for sorting the histogram indexes included in the histogram information in the order of decending magnitudes and generating a set of position data corresponding to the sorted histogram indexes as the scanning order information.

2. The digital video signal encoder as recited in claim 1, wherein the statistical coding means includes a variable length coder for variable length coding the quantized transform coefficients to thereby generate the statistically coded data.

3. The digital video signal encoder as recited in claim 1, wherein said source coding means includes:

means for generating a set of transform coefficients corresponding to each of the coding blocks; and means for quantizing said set of transform coefficients into the set of quantized transform coefficients.

4. A digital video signal encoder for coding a digital video signal to provide a digitally coded video signal, wherein the digital video signal is represented by a series of video frames, each video frame being divided into a plurality of coding blocks, which comprises:

source coding means for generating a set of quantized transform coefficients corresponding to each of the coding blocks;

scanning order determination means for counting a number of quantized transform coefficients having a non-zero value, located at a same pixel position in said each of the coding blocks contained in a video frame and determining a scanning order for each video frame based on the counted numbers;

scanning means for scanning the set of quantized transform coefficients in response to the scanning order to thereby generate scanned quantized transform coefficients;

statistical coding means for performing the statistical coding of the scanned quantized transform coefficients to thereby generate statistically coded data; and channel coding means for encoding the statistically coded data together with the scanning order information to thereby generate digitally coded video signal;

wherein the scanning order determination means includes:

counting means for counting the number of quantized transform coefficients having a non-zero value, located at a same pixel position in said each of the coding blocks contained in the video frame; and sorting means for sorting the counted numbers for each of the pixel positions in said each of the coding blocks to thereby determine the scanning order, and wherein the counting means includes:

means for generating a set of position addresses representing the pixel positions in a coding block;

means for generating a set of block addresses in response to each of the position addresses, the block addresses sequentially designating the coding blocks in the video frame;

memory means having a plurality of storage regions, for storing the set of quantized transform coefficients for each of the coding blocks in each storage region thereof, and sequentially producing a multiplicity of data sets in response to said each of the position addresses and the set of block addresses for said each of the position addresses, each of the data sets including the quantized transform coefficients located at the same position in said each of the coding blocks; and means for counting a number of the quantized transform coefficients having the non-zero value in each of the data sets and providing a histogram index for said each of the data sets, the histogram index representing the counted number for each of the data sets;

and wherein the sorting means includes:

memory means for sequentially storing the histogram indexes for the data sets to thereby provide histogram information including a multiplicity of histogram indexes and position data representing a pixel position corresponding to each of the histogram indexes; and means for sorting the histogram indexes included in the histogram information in the order of descending magnitudes thereof, thereby generating a set of position data corresponding to the sorted histogram indexes as scanning order information representing the scanning order.

5. The digital video signal encoder as recited in claim 4, wherein the statistical coding means includes a variable length coder for variable length coding the quantized transform coefficients to thereby generate the statistically coded data.

6. The digital video signal encoder as recited in claim 5, wherein the source coding means includes:

means for generating a set of transform coefficients corresponding to each of the coding blocks;

means for quantizing the coefficients into the set of transformed coefficients.

* * * * *